Figure 5A:
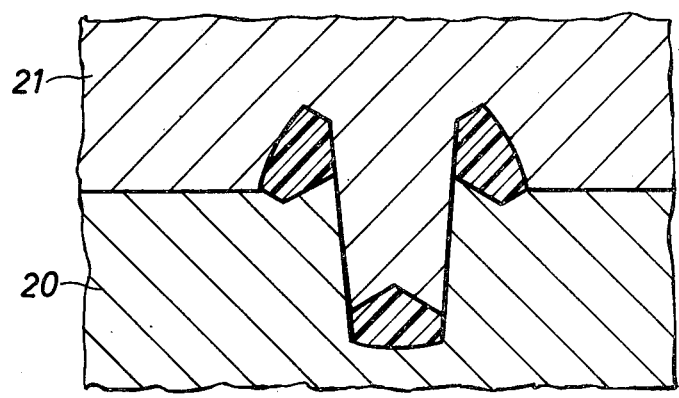

United States Patent [19]
Hehl

[11] 3,905,270
[45] Sept. 16, 1975

[54] ONE-PIECE FASTENING ELEMENT

[75] Inventor: Klaus Friedrich Hehl, Norderstedt, Germany

[73] Assignee: Illinois Tool Works Inc., Chicago, Ill.

[22] Filed: July 10, 1974

[21] Appl. No.: 487,352

[30] Foreign Application Priority Data
July 11, 1973 Germany............................ 25503

[52] U.S. Cl................ 85/5 R; 24/73 PF; 24/73 HS; 85/8.3; 85/80
[51] Int. Cl.² ........................................ F16B 13/04
[58] Field of Search............ 85/5 R, 8.3, DIG. 2, 80; 24/73 P, 73 PF, 73 HS

[56] References Cited
UNITED STATES PATENTS

| | | | |
|---|---|---|---|
| 2,983,008 | 5/1961 | Von Rath | 85/DIG. 2 |
| 3,029,486 | 4/1962 | Raymond | 85/DIG. 2 |
| 3,214,878 | 11/1965 | Duffy et al. | 85/80 |
| 3,271,059 | 9/1966 | Pearson | 85/8.3 |

Primary Examiner—Marion Parsons, Jr.
Attorney, Agent, or Firm—Robert W. Beart; Jack R. Halvorsen

[57] ABSTRACT

A one-piece fastening element comprising a head and a shank adapted to be inserted into an aperture in a workpiece. The shank comprises a plurality of spring legs having a stepped contour adapted to engage the other side of the workpiece.

4 Claims, 6 Drawing Figures

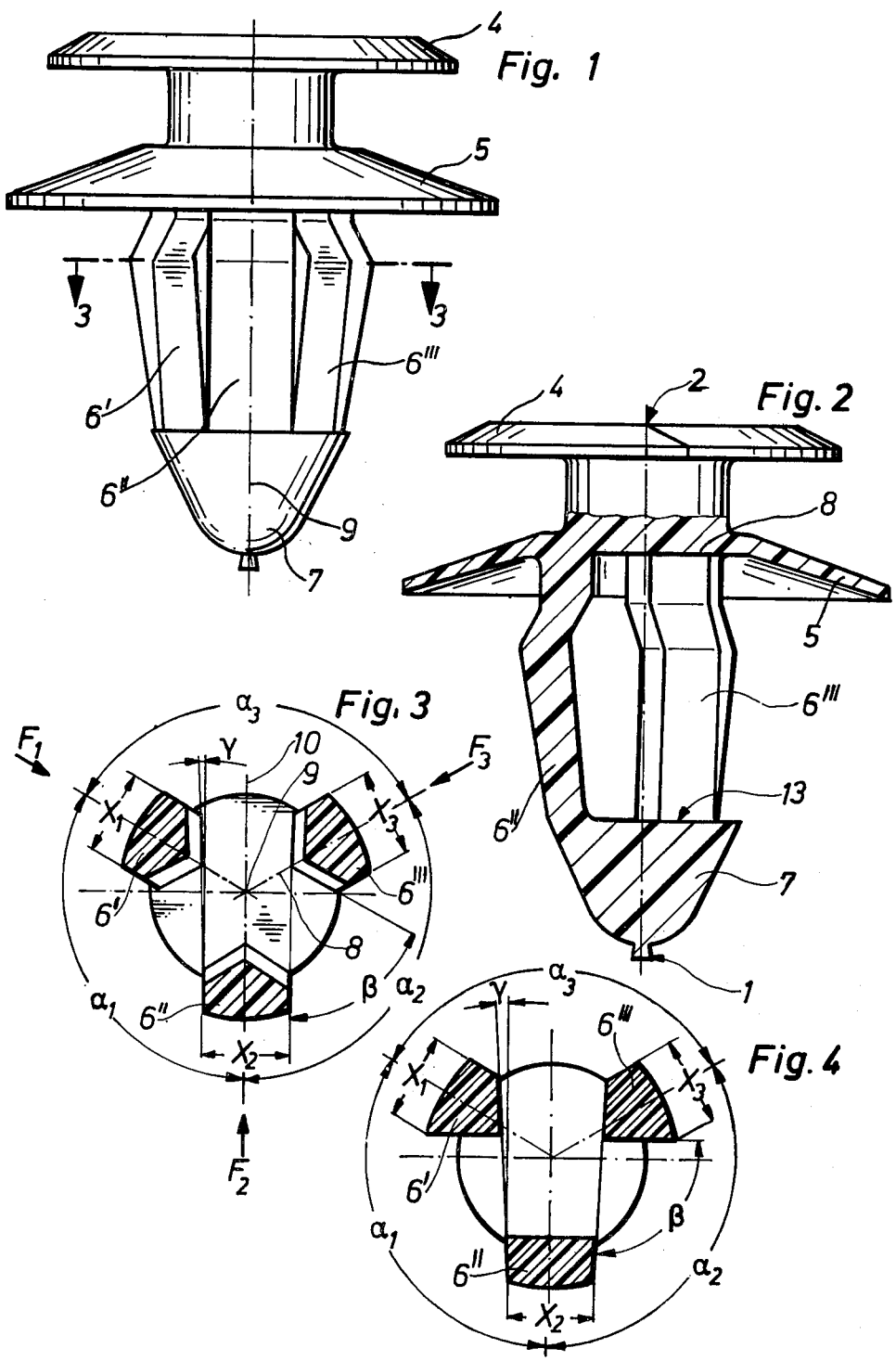

ONE-PIECE FASTENING ELEMENT

The invention relates to a one-piece fastening element out of synthetic material which is capable of being inserted into a fastening aperture of a workpiece in a self-retaining manner, comprising a head lying close to one side of the workpiece, and a shank adapted to be inserted into the fastening aperture, said shank having several spring legs arranged in the manner of a basket, said spring legs being formed integrally with the head and uniting at the lower end to form a point of introduction, the outer surface of the spring legs having a stepped contour adapted to be brought into engagement with the other side of the workpiece.

Such fastening elements are being used in many cases of application, such as for example in the automotive industry, in order to keep cables, lines and other members attached to carrier workpieces. The fastening elements are if possible to be designed in such a manner that that they may be easily mounted under most different conditions, are variably predeterminable as to the forces of insertion and removal, and may be reused several times. The capability of being reused, in particular, makes it a condition that the design of such fastening elements meet particularly high requirements. They must be designed to be well resilient, with the resilient behaviour resulting predominantly from a resiliency of shape. In order to keep the flow which is constantly taking place, in narrow limits, it is important especially when using thermoplatic materials of what order of size the unit area load of a fastening element is expected to be.

So-called expansion rivets out of synthetic material have become known as fastening elements which are provided with a head and a radially spreadable shank. The shank is crowned either inside or outside, with the shank being spreaded apart with the aid of a spreading mandrel to be driven in, in order to generate an undercut in rear of the fastening aperture (German petty patent No. 6,927,507).

A fastening element has furthermore become known provided with an anchor-shaped spreading web, in which the shank comprises at least one resilient side arm integrally adjoining the entry end of the shank and inclined rearward from there in a direction towards the axis of the shank, while having its free end adjacent the head lying close to the rear side of the workpiece (German publication letter No. 1,217,142). Such one-piece fastening elements are particularly suited to be easily inserted in apertures of different sizes which are formed in plates constituting the workpieces.

Other known fastening elements are designed in a similar manner as the last mentioned fastening elements, which work according to the principle of a notched pin and in the case of which a full shank having a divergent/convergent outer contour and an outside diameter greater in comparison with the diameter of the bore is provided with slots in certain places so as to be capable of being compressed when being inserted in the fastening aperture to expand again after having been inserted. In this arrangement, there is normally provided a so-called predetermined bending point at which a permanent plastic deformation is to result when the fastening element is being installed in a fastening aperture, which accomplishes an anchoring of the shank in the fastening aperture (German publication letter No. 1,400,210).

One-piece fastening elements have furthermore become known which are designed in the form of a basket. The shank comprises a tubular center portion having four diametrically opposed ribs arranged in pairs integrally formed thereat, said ribs uniting at the free end to form a point of introduction. The outer contour of the ribs is a divergent/convergent one (German petty patent No. 1,990,097).

Finally, one-piece fastening elements have become known in which the shank consists of several spring legs arranged in the manner of a basket which are formed integrally with the head and unite at the lower end to form a point of introduction. With one known embodiment, three spring legs are used which are arranged irregularly about the circumference of the shank (German laying-open letter No. 1,625,288). With another known embodiment the shank is formed of four spring legs uniformly distributed about the circumference of the shank with the spring legs disposed opposite each other always being offset against each other with respect to the axis of the shank by one width of spring leg (German petty patent No. 1,951,751). With another embodiment likewise having four spring legs the spring legs taper towards the point of introduction (German petty patent No. 7,021,338). With numerous cases of application the use of expansion rivets is relatively costly because they are not formed in one piece and, in addition, the mounting operation requires not only the insertion of the shank into a fastening aperture but also the driving-in of the spreading mandrel. In all the instances, where no particularly great holding force is required, one-piece fastening elements are preferred. The above-described anchor-shaped fastening elements and those fastening elements working to the notched pin principle suffer from the disadvantage that they because of their configuration normally enable only a resilient two-point support which with vibrations occurring frequently is undesired. Another disadvantage connected with the two-point support of a fastening element resides in that both when mounting and demounting non-centric and non-paraxial forces will occur rendering difficult the handling of the fastening elements.

The above-described known fastening element the shank of which is provided with a tubular center portion and with three ribs integrally formed therewith in uniformly spaced arrangement indeed answers the requirement of a statically stable three point support, however, it can be made only with the aid of a complicated slide or die type tool which considerably contributes to increase the cost of such an element. What is furthermore disadvantageous is that in particular with relatively small dimensions of aperture and short overhanging lengths no optimum springing is given. With difficult cases of mounting it is furthermore necessary that a so-called point of introduction be inserted from below into the hollow center portion. The loose point adds to the cost of the entire fastening element. The above-described fastening element which likewise comprises three spring legs which are, however, arranged asymmetrically about the circumference of the shank may indeed be fabricated with a much less costly plate type tool but, on the other hand, when inserting or loosening the fastening element no symmetric distribution of forces is obtained which may lead to canting. Besides, the asymmetric distribution of forces leads to locally occurring high pressures per unit area which, due to the relatively high tendency to flow of the mostly used synthetic materials constitutes a condierable disadvantage.

With the known embodiment comprising the four spring legs which, besides, may also be fabricated with a plate type tool the essential disadvantage which results is that the width of leg which constitutes an important measure for the lateral bending of the spring legs may be increased only in a limited extent because otherwise the forming of the fastening element may no longer be accomplished. The shank of such a fastening element though normally having good resiliency yet is as a whole relatively weak and can be reinforced only in limits, which makes itself felt in the mounting forces in particular when the mounting operation is several times repeated. In this connection it has indeed become known with one embodiment to increase the width of the critical upper portion of the spring leg. The result of this, however, is that the sheet members to be inserted during fabrication in the lower range of introduction must be decreased in width. Such a shank is altogether relatively difficult to form using a plate type tool, because there are long areas of friction which will entail a relatively high rate of wear.

It is the object of the invention to provide a one-piece fastening element out of synthetic material which has good resiliency, lies close to the workpiece in a statically determinable manner and the production of which is relatively inexpensive.

With a fastening element of the type mentioned at the beginning this problem is solved in that the shank is formed of three spring legs uniformly spaced about the circumference of the shank.

With the fastening element according to the invention the bending forces effective on the spring legs in mounting and demounting operations, respectively, are uniformly distributed about the circumference, so that a statically determined position of the fastening element in the fastening apertures is guaranteed. Locally defined high pressures per unit area are avoided. The width of the spring legs may be selected to be relatively great so that the pressure per unit area may altogether be kept relatively low. The outer configuration of the spring legs in this arrangement suitably is adapted to the contour of the fastening aperture.

In one embodiment of the invention provision is made for the spring legs to be approximately of one and the same width over the entire length thereof. With a suitable width of leg a good resilient behaviour of the shank is obtained thereby and the danger of a lateral bending of the spring legs considerably reduced.

So that the fastening element according to the invention may be formed in a plate type tool in a simple manner, provision is made in a further embodiment of the invention for the width of a spring leg to be at the highest equal to the shortest distance between two adjacent spring legs.

In order to simplify the forming of the fastening elements still further, provision is made in another embodiment of the invention for the spring legs to be approximately of a pentagonal cross sectional area. In another embodiment provision is made in this connection for the pentagonal cross sectional area to be approximately symmetrical concerning its sides about an axis intersecting the axis of the shank with the point of pentagon coinciding with the axis of symmetry facing towards the axis of the shank. Such fastening elements may be shaped in a particularly favourable manner with the aid of a simple plate type tool with surfaces in sliding contact with each other and so-called knife edges being avoided. The interengaging cores of the workpieces may be selected to be blunt in a considerable extent. In another embodiment of the invention provision is made for the pentagonal cross sectional areas of two spring legs to be arranged symmetrically concerning the sides with respect to the axis of symmetry of the third spring leg and that the pentagonal side adjacent to the radially inwardly pointing pentagonal point which faces away from said axis of symmetry includes an angle therewith which is greater than 20°. This defined angle essentially determines the rigidity of the contour of the tool.

It is of course possible to use also another suitable polygonal cross sectional area for the spring legs in order to enable a favourable configuration of the tools and economical forming of the fastening elements.

In another embodiment of the invention provision has been made for the pentagonal cross sectional areas of two spring legs to be arranged symmetrically as to their sides about the axis of symmetry of the third spring leg and that the pentagonal side adjacent the radially inwardly pointing peak of pentagon which faces the said axis of symmetry includes a small outwardly opening angle therewith. Owing to this so-called deforming angle long paths of frictional engagement are avoided. This angle suitably is more than 2° to 3°. The tool required for such a fastening element is distinguished by its long life and good running properties.

Starting out from a tool for the production of a fastening element in which there are provided two plate type tools adapted to be moved towards each other or away from each other and at least one injection opening for liquid synthetic material, the invention finally proposes in another embodiment that one injection opening be arranged in such a manner that at the lowermost end of the point of introduction of the fastening element to be molded in the direction of the shank axis and/or another injection opening is arranged in such a manner that injection is effected at the head of the fastening element in the direction of the axis of the shank. The forming tool defines so-called bouncing areas in the interior of the fastening element which are disposed opposite the point of introduction and the head, respectively. The injection at the above-described points guarantees a uniform filling of the spring legs at a high rate of flow and with little whirl formation. As a result of this an improved textural structure of the fastening element is obtained while simultaneously enabling a quicker fabrication of the fastening element because, as already explained above, the liquid synthetic material may be injected at a very high rate.

An example of embodiment will be described in the following by way of the drawings. In the drawings, FIG. 1 shows a side view of a fastening element in accordance with the invention, FIG. 2 shows a partial sectional view of the fastening element according to FIG. 1, FIG. 3 shows a cross sectional view of the spring legs of the fastening element of FIG. 1 taken on line 3—3, FIG. 4 shows a cross sectional view of another embodiment similar to that one of FIG. 3, FIGS. 5a and b show tools for the embodiments according to the FIGS. 3 and 4.

The head of the fastening element shown in FIGS. 1 to 3 comprises a spring plate 5 which serves as a sealing with respect to a fastening aperture (not shown). Above the spring plate 5 there is arranged another plate 4 which serves to retain an article. The plate 4 may be replaced, for example, by a cable holder or any other holding element. The shank of the fastening element comprises three spring legs 6', 6'' and 6''' uniformly distributed about the circumference thereof which throughout the entire length thereof have the same width $x_1$, $x_2$, $x_3$. In the present case the width of the spring legs is the same, in general it need not be so. The spring legs 6', 6'', 6''' unite at the bottom to form a point of introduction 7.

In FIG. 2 the contour of the spring legs is recognizable. They are diverging in the upper portion while in the lower portion they are converging again, thereby forming a basket-like shank with a step-like outer contour adapted to be engaged with the underside of a work plate (not shown) for retaining the fastening element inserted in an aperture formed in the plate.

As will be seen from FIG. 3, the spring legs 6', 6'', 6''' are of a pentagonal cross sectional configuration, with the cross sectional configuration being symmetrical as to the sides thereof about an axis 8 which intersects the axis 9 off the shank. The peak of pentagon coinciding with the axis of symmetry 8 in this arrangement faces towards the axis of the shank. As will be seen, this cross sectional area of the spring legs enables an extremely simple and stable contour for the plate type tools used for forming such a fastening element. The angle $\beta$ which is included between the pentagonal side adjacent the pentagonal point pointing radially inwardly and facing away from the axis of symmetry 8, and the latter, and which suitably is greater than 20°, determines the rigidity of the contour of the plate type tool. The angles $\alpha_1$, $\alpha_2$ and $\alpha_3$ determine the space between the spring legs about the circumference of the shank and in the present case are all of the same dimension. The angle $\delta$ between one pentagonal side and one axis of symmetry 10 between adjacent spring cross sectional areas of the spring legs 6' and 6'' which suitably is over 2° or 3°, determines the deforming taper when deforming the fastening element. Any friction over long distances is avoided so that a long life of the tools is guaranteed.

As will furthermore be seen from the cross sectional area of FIG. 3 a good three point support is obtained by the arrangement of the spring legs, which is indicated by the bending forces $F_1$, $F_2$ and $F_3$, respectively, acting on the spring legs 6', 6'' and 6'''.

As will finally be seen from FIG. 2, the surfaces 8 and 13 of head and point of introduction 7 which are arranged inside the spring legs 6', 6'' and 6''' and are disposed opposite each other are smooth. Because of this the corresponding surfaces of the plate type tool are effective as bouncing surfaces when the synthetic material is injected at the lower end of the introduction point 7 at 1, or at 2 at the plate 4. Owing to the injection at these points a uniform filling of the spring legs at a high rate of flow and little whirl formation is guaranteed. One obtains hereby a fastening element which is improved as regards the properties of the material and which may at the same time be produced at a high rate of production due to the high rate of flow of the synthetic material.

FIG. 4 shows another possibility of forming the spring legs 6', 6'', 6'''. The spring legs 6' and 6''' are of an irregular pentagonal shape, while the spring leg 6'' is of a trapezoidal shape. With this design of the spring legs, however, a corresponding radial moment of resistance is obtained as is the case with the embodiment according to FIG. 3. The deforming angle $\delta$ is likewise available as is the case with the element according to FIG. 3 and is of a dimension approximately as described above. The angles $\alpha$ are selected in such a manner that they are approximately or absolutely of equal dimensions. Also the angle $\beta$ with the fastening element according to FIG. 4 ensures a sufficient degree of rigidity of the plate type tool.

Figure 5B:
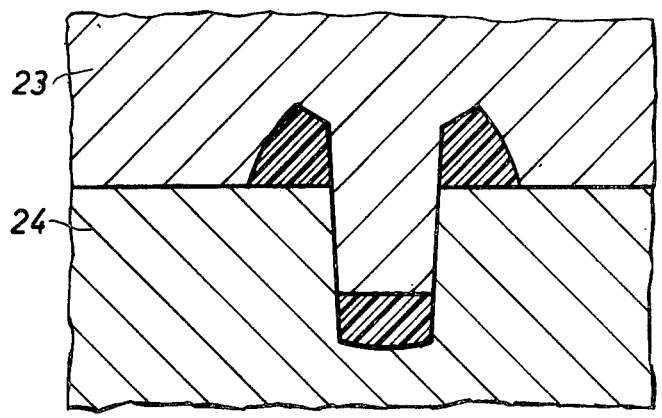

FIG. 5a shows a cross sectional view of the plate type tools 20, 21 by means of which a fastening element according to FIG. 3 may be formed. FIG. 5b shows plate type tools 22, 23 for forming the fastening element according to FIG. 4. In both cases it may be recognized that the forming tools have a rigid contour and a favourable deforming taper which ensures extremely low wear of the tools and thus a long life thereof. In spite of the very favourable tool contour fastening elements are obtained which are distinguished for their high moment of radial resistance.

The injection of the liquid synthetic material takes place in the manner as described above.

I claim:

1. A one-piece fastening element made from synthetic material which is adapted to be inserted in a fastening aperture of a complementary workpiece in a self-retaining manner, comprising a head adapted to lie in close proximity to one side of the complementary apertured workpiece and a shank extending from said head and adapted to be introduced into the fastening aperture, said shank consisting of three spring legs formed integrally with the head and united at their terminal end to form an entering end portion, said three spring legs each provided with a step-like shoulder intermediate said head and said entering end portion adapted to engage the surface of the complementary apertured workpiece opposite the surface engaged by said head, said legs being pentagonal in cross-section from the vicinity of said head portion to the terminal entering portion and diminishing in cross-sectional area in the same direction, the pentagonal peak of each of said legs facing inwardly in the direction of the axis of the fastener, said three legs being separated by slots in said shank which have a circumferential dimension at least equal to the circumferential measurement of each of said legs.

2. A one-piece fastening element of the type described in claim 1 wherein the greatest cross-sectional dimension of said three legs having a pentagonal cross-section is greatest in the vicinity of the step-like shoulder on each of said legs.

3. A one-piece fastening element of the type described in claim 1 wherein the circumferential dimension of each of said three spring legs having approximately the same circumferential dimension throughout their length having a diminishing radial thickness from the vicinity of said head to the entering end portion of the fastener whereby said pentagonal cross-sectional area diminishes from the vicinity of said head portion in a direction toward said entering end portion.

4. A one-piece fastening element of the type described in claim 1 wherein the step-like shoulder portion of each of said three spring legs is an arc of a circle in cross-section spaced equally outwardly from the axis of the fastener.

* * * * *